US010845944B2

(12) United States Patent
Luo et al.

(10) Patent No.: US 10,845,944 B2
(45) Date of Patent: Nov. 24, 2020

(54) DESKTOP GENERATION AND OPERATION METHODS FOR MOBILE TERMINAL AND CORRESPONDING DEVICES THEREOF

(71) Applicant: BEIJING BYTEDANCE NETWORK TECHNOLOGY CO LTD., Beijing (CN)

(72) Inventors: Yonghao Luo, Beijing (CN); Shoufu Chen, Beijing (CN); Chi Fang, Beijing (CN); Xiaomu Zhu, Beijing (CN); Tian Li, Beijing (CN)

(73) Assignee: BEIJING BYTEDANCE NETWORK TECHNOLOGY CO LTD., Beijing (CN)

(*) Notice: Subject to any disclaimer, the term of this patent is extended or adjusted under 35 U.S.C. 154(b) by 464 days.

(21) Appl. No.: 14/779,777

(22) PCT Filed: Dec. 30, 2013

(86) PCT No.: PCT/CN2013/090867
§ 371 (c)(1),
(2) Date: Sep. 24, 2015

(87) PCT Pub. No.: WO2014/154004
PCT Pub. Date: Oct. 2, 2014

(65) Prior Publication Data
US 2016/0085413 A1 Mar. 24, 2016

(30) Foreign Application Priority Data
Mar. 27, 2013 (CN) .......................... 2013 1 0103013

(51) Int. Cl.
*G06F 3/0481* (2013.01)
*G06F 9/451* (2018.01)
(Continued)

(52) U.S. Cl.
CPC ........ *G06F 3/04817* (2013.01); *G06F 3/0481* (2013.01); *G06F 3/0488* (2013.01);
(Continued)

(58) Field of Classification Search
CPC .. G06F 3/0481; G06F 3/04817; G06F 3/0488; G06F 3/04886; G06F 9/451
See application file for complete search history.

(56) References Cited

U.S. PATENT DOCUMENTS 6,061,058 A * 5/2000 Owens ................. G06F 3/0483
715/769
9,772,751 B2 * 9/2017 Anzures ............... G06F 3/0483
(Continued)

FOREIGN PATENT DOCUMENTS

CN 102184072 A 9/2011
CN 102622180 A 8/2012
(Continued)

OTHER PUBLICATIONS

International Search Report dated Apr. 3, 2014 for PCT application No. PCT/CN2013/090867.

*Primary Examiner* — Amy Ng
*Assistant Examiner* — Sajeda Muhebbullah
(74) *Attorney, Agent, or Firm* — Mauriel Kapouytian Woods LLP; Lana Akopyan; Michael Mauriel

(57) ABSTRACT

Disclosed is a desktop generation method for a mobile terminal. The method includes: creating a block object, the block object containing attribute information; invoking a drawing function, drawing a plurality of blocks according to the attribute information about the block object, and distributing the plurality of blocks on the screen of a mobile terminal without superposition so as to form a desktop; and when the shortcut of an application program is required to be displayed on the desktop, displaying a shortcut icon and/or a program name of the shortcut of the application program in an idle block on the desktop, the idle block being a block in which the shortcut of the application program is not displayed. Also disclosed are a desktop generation device of (Continued)

a mobile terminal, a desktop operation method for a mobile terminal and a corresponding device thereof.

15 Claims, 4 Drawing Sheets

(51) Int. Cl.
  *G06F 3/0488* (2013.01)
  *G06F 3/0484* (2013.01)
(52) U.S. Cl.
  CPC ...... *G06F 3/04842* (2013.01); *G06F 3/04886* (2013.01); *G06F 9/451* (2018.02)

(56) References Cited

U.S. PATENT DOCUMENTS

| | | | | |
|---|---|---|---|---|
| 2008/0184112 | A1* | 7/2008 | Chiang | G06F 3/04817 715/700 |
| 2010/0295789 | A1* | 11/2010 | Shin | G06F 1/1626 345/168 |
| 2011/0105187 | A1* | 5/2011 | Dobroth | G06F 3/0481 455/566 |
| 2012/0174010 | A1* | 7/2012 | Flint | G06F 3/0482 715/769 |
| 2012/0264487 | A1* | 10/2012 | Nomachi | G06F 3/04817 455/563 |
| 2013/0187866 | A1* | 7/2013 | Kim | G06F 3/0488 345/173 |
| 2013/0234949 | A1* | 9/2013 | Chornenky | G06F 3/0216 345/169 |
| 2014/0372911 | A1 | 12/2014 | Li et al. | |

FOREIGN PATENT DOCUMENTS

| | | |
|---|---|---|
| CN | 102637125 A | 8/2012 |
| CN | 102819401 A | 12/2012 |
| CN | 102819574 A | 12/2012 |
| CN | 103150170 A | 6/2013 |

* cited by examiner

DESKTOP GENERATION AND OPERATION METHODS FOR MOBILE TERMINAL AND CORRESPONDING DEVICES THEREOF

CROSS REFERENCE OF RELATED APPLICATION

The present application is a national phase of international application No. PCT/CN2013/090867 which claims a priority to Chinese Patent Application No. 201310103013.7, titled as "DESKTOP GENERATION AND OPERATION METHODS FOR MOBILE TERMINAL AND CORRESPONDING DEVICES THEREOF", filed on Mar. 27, 2013 with State Intellectual Property Office of People's Republic of China, which are incorporated herein by reference in their entirety.

FIELD

The present application relates to the field of information processing technology, and in particular to a desktop generation and operation methods for a mobile terminal and corresponding devices thereof.

BACKGROUND

With the development of communication technology, the mobile terminal is increasingly popular, and there are more and more application programs which can be run on the mobile terminal. In order to open these application programs, it needs to find an executable file of the application program on the mobile terminal and then click the executable file to start the application program to run. Usually, in order to start the application program conveniently, a shortcut for the application program is generated on a desktop of the mobile terminal once the application program is installed on the mobile terminal. The shortcut includes contents indicating the application program, for example, an icon or a program name. The number of shortcuts on the desktop increases as more application programs run on the mobile terminal. These shortcuts each occupy a predetermined region of the whole desktop and are arranged on the desktop based on a preset rule (for example, arranged close to the right side and the upper side of the screen of the mobile terminal). In order to facilitate management of the shortcuts of application programs, it is required in the conventional technology that each shortcut icon on the desktop is rounded rectangular. During practice process, the shortcut icons of application programs have various shapes, for example, a regular shape such as a triangle or a circle, or an irregular shape. Before these icons with different shapes are presented on the desktop of the mobile terminal, the shortcut icons are generally manufactured to be in a shape of rounded rectangle by using a special software, such that the shortcut icons are arranged on the desktop of the mobile terminal smoothly. However, this way limits presentation forms of the shortcut icons of application programs, reduces the tolerance of the mobile terminal to application programs, and increases the difficulty in presenting the shortcut icons on the desktop.

SUMMARY

In order to address the technical problem described above, a desktop generation method for a mobile terminal, a desktop operation method for a mobile terminal and corresponding apparatuses thereof are provided by embodiments of the application, so as to improve the tolerance of the mobile terminal to the application program and reduce the difficulty in presenting the shortcut icon on the desktop.

A desktop generation method for a mobile terminal provided by an embodiment of the application includes:

creating a block class object, where the block class object includes attribute information;

drawing, by calling a drawing function, multiple blocks based on the attribute information of the block class object, to make the multiple blocks be distributed on a whole screen of the mobile terminal without overlap to form a desktop; and presenting, in an idle block on the desktop, a shortcut icon and/or program name of a shortcut for an application program in a case that the shortcut for the application program is required to be presented on the desktop, where the idle block is a block on which no shortcut for an application program is presented.

Preferably, presenting, in an idle block on the desktop, a shortcut icon and/or program name of a shortcut for an application program in a case that the shortcut for the application program is required to be presented on the desktop includes:

monitoring a message of requiring creating a shortcut for an application program on the desktop which is sent from an operating system of the mobile terminal; reading a shortcut icon and/or program name of the application program for which the shortcut is required to be created on the desktop; and detecting an idle block on the desktop and presenting the shortcut icon and/or program name of the application program in an idle block.

Preferably, the block is a rectangular block, the number of the multiple blocks is N×M, where N is the number of the blocks on the desktop of the mobile terminal in a transverse direction, M is the number of the blocks on the desktop of the mobile terminal in a longitudinal direction, and N and M each are natural numbers greater than or equal to 2.

Further preferably, the blocks are spaced apart by a preset distance.

A desktop operation method for a mobile terminal is further provided by an embodiment of the application. The method includes:

performing an action in a predetermined action manner to present multiple desktops described above on a screen of the mobile terminal; and receiving an operation message by taking the desktop or a block included in the desktop as an operation object, and performing a corresponding operation on the operation object based on a type of the operation message.

Preferably, the operation object is the desktop, the type of the operation message is integral movement of the desktop, and performing the corresponding operation on the operation object based on the type of the operation message includes:

detecting whether the operation message of integral movement is received by one of the multiple desktops; and creating a list corresponding to the one desktop for recording sequence numbers of blocks included in the one desktop and position information of the blocks in the one desktop, in a case that the operation message of integral movement is received by the one desktop; and detecting a target position to which the one desktop is to be moved integrally, and drawing the desktop at the target position by calling a drawing function, based on the sequence numbers of the blocks and the position information of the blocks in the desktop recorded in the list.

Preferably, the operation object is the block in the desktop, the type of the operation message is selecting a block in one or more desktops and moving the selected block to a target desktop, and performing the corresponding operation on the operation object based on the type of the operation message includes:

detecting whether the operation message of selecting and moving is received by a block in the screen of the mobile terminal; and recording in a list a sequence number of the block and position information of the block in the desktop in a case that the operation message of selecting and moving is received by the block, where the list is created when the operation message of selecting and moving is received by a block in the screen of the mobile terminal for the first time; and detecting a target position to which the block is to be moved, and interchanging positions of an idle block and the block in the list, based on the sequence number of the block and the position information of the block in the desktop recorded in the list.

Further preferably, it is detected whether there is an idle block in the desktop where the target position is located in a case that the target position to which the block is to be moved is detected; and in a case that there is an idle block and the number of the idle blocks is greater than or equal to the number of the blocks recorded in the list, positions of the idle block and the block in the list are interchanged based on the sequence number of the block and the position information of the block in the desktop recorded in the list.

Preferably, the operation object is the block in the desktop, the type of the operation message is displaying and hiding of the desktop, and performing the corresponding operation on the operation object based on the type of the operation message includes:

detecting whether the operation message of displaying and hiding is received by one of the multiple desktops; changing an attribute value of a visible attribute of a block in the one desktop to an opposite attribute value, in a case that the operation message of displaying and hiding is received by the one desktop; refreshing the desktop, and drawing the block in the desktop by calling a drawing function to display the desktop and the block in the desktop or not drawing the block in the desktop by calling the drawing function to hide the desktop and the block in the desktop based on the attribute value.

A desktop generation apparatus for a mobile terminal is further provided according to an embodiment of the application. The apparatus includes a class object creating unit, a block drawing unit and a shortcut presenting unit; where the class object creating unit is configured to create a block class object, where the block class object includes attribute information;

the block drawing unit is configured to draw multiple blocks by calling a drawing function based on the attribute information of the block class object, to make the multiple blocks be distributed on a whole screen of the mobile terminal without overlap to form a desktop; and the shortcut presenting unit is configured to present, in an idle block on the desktop, a shortcut icon and/or program name of a shortcut for an application program in a case that the shortcut for the application program is required to be presented on the desktop, where the idle block is a block on which no shortcut for an application program is presented.

Preferably, the shortcut presenting unit further includes a message monitoring subunit, a shortcut reading subunit, an idle block detecting subunit and a shortcut presenting subunit, where the message monitoring subunit is configured to monitor a message of requiring creating a shortcut for an application program on the desktop which is sent from an operating system of the mobile terminal;

the shortcut reading subunit is configured to read a shortcut icon and/or program name of the application program for which the shortcut is required to be created on the desktop;

the idle block detecting subunit is configured to detect an idle block on the desktop; and the shortcut presenting subunit is configured to present the shortcut icon and/or program name of the application program in an idle block, in a case that it is detected that there is an idle block on the desktop.

A desktop operation apparatus for a mobile terminal is further provided by an embodiment of the application. The apparatus includes a multiple-desktop presenting unit, an operation message receiving unit and an operation unit, where the multiple-desktop presenting unit is configured to perform an action in a predetermined action manner to present multiple desktops described above on a screen of the mobile terminal;

the operation message receiving unit is configured to receive an operation message taking the desktop or a block included in the desktop as an operation object; and the operation unit is configured to perform a corresponding operation on the operation object based on a type of the operation message.

Presently, the operation object is the desktop, the type of the operation message is integral movement of the desktop, and the operation unit includes a first operation message detecting subunit, a first list creating subunit, a first target position detecting subunit and a desktop drawing subunit, where the first operation message detecting subunit is configured to detect whether the operation message of integral movement is received by one of the multiple desktops, and trigger the list creating subunit in a case that the operation message of integral movement is received by the one desktop;

the first list creating subunit is configured to create a list corresponding to the one desktop for recording sequence numbers of blocks included in the one desktop and position information of the blocks in the one desktop;

the first target position detecting subunit is configured to detect a target position to which the one desktop is to be moved integrally; and the desktop drawing subunit is configured to draw the desktop at the target position by calling a drawing position, based on the sequence numbers of the blocks and the position information of the blocks in the desktop recorded in the list.

Preferably, the operation object is the block in the desktop, the type of the operation message is selecting a block in one or more desktops and moving the selected block to a target desktop, and the operation unit includes a second operation message detecting subunit, a second list creating subunit, a block information recording subunit, a second target position detecting subunit and a position interchanging subunit, where the second operation message detecting subunit is configured to detect whether the operation message of selecting and moving is received by a block in the screen of the mobile terminal, and trigger the block information recording subunit in a case that the operation message of selecting and moving is received by the block;

the block information recording subunit is configured to record in a list a sequence number of the block and position information of the block in the desktop;

the second list creating subunit is configured to create the list when the operation message of selecting and moving is received by a block in the screen of the mobile terminal for the first time;

the second target position detecting subunit is configured to detect a target position to which the block is to be moved; and the position interchanging subunit is configured to interchange positions of an idle block and the block in the list, based on the sequence number of the block and the position information of the block in the desktop recorded in the list.

Further preferably, the operation unit further includes an idle block detecting subunit, and the idle block detecting subunit is configured to detect whether there is an idle block in a desktop where the target position is located, in a case that the target position to which the block is to be moved is detected; and trigger the position interchanging subunit in a case that there is an idle block and the number of the idle blocks is greater than or equal to the number of the blocks recorded in the list.

Preferably, the operation object is the block in the desktop, the type of the operation message is displaying and hiding of the desktop, and the operation unit includes a third operation message detecting subunit, a block attribute adjusting subunit and a displaying and hiding subunit, where the third operation message detecting subunit is configured to detect whether the operation message of displaying and hiding is received by one of the multiple desktops; and trigger the block attribute adjusting subunit in a case that the operation message of displaying and hiding is received by the one desktop;

the block attribute adjusting subunit is configured to change an attribute value of a visible attribute of a block in the one desktop to an opposite attribute value; and the displaying and hiding subunit is configured to draw the block in the desktop by calling a drawing function to display the desktop and the block in the desktop or not draw the block in the desktop by calling the drawing function to hide the desktop and the block in the desktop based on the attribute value, after the desktop is refreshed.

According to the embodiments of the application, the block class object including attribute information is created firstly, then multiple blocks are drawn by calling a drawing function based on the attribute information of the block class object, to make the multiple blocks be distributed on the whole screen of the mobile terminal without overlap to form a desktop; in a case that a shortcut for an application program is required to be presented on the desktop, the shortcut is presented in an idle block on the desktop. Compared with the conventional technology, blocks are created and the desktop of the mobile terminal is formed by arrangement of these independent blocks in the embodiment of the application. If a shortcut for an application program is required to be presented on the desktop, the icon or program name of the shortcut is presented in one block rather than on the whole desktop (occupying certain region of the whole desktop), i.e., the icon or program name of the application program is presented using the block instead of the whole desktop. Therefore, the icon or program name of the application program can be in various shapes, and thereby increasing the tolerance of the desktop to the application program and reducing the difficulty in presenting the shortcut icon on the desktop.

BRIEF DESCRIPTION OF THE DRAWINGS

In order to illustrate technical solutions in embodiments of the invention or the conventional technology more clearly, hereinafter drawings for the description of the embodiments or the conventional technology are introduced briefly. Apparently, the drawings described below are only some embodiments of the invention, and other embodiments and drawings may be obtained by those skilled in the art based on the embodiments shown by these drawings.

DETAILED DESCRIPTION

In order to better understand the technical solutions of the application by those skilled in the art, hereinafter the technical solutions of the embodiments of the application are described clearly and completely in conjunction with the drawings of the embodiments of the application. Apparently, the described embodiments are only some of embodiments of the application, but not all embodiments. Any other embodiments obtained based on the embodiments of the application by those skilled in the art without any creative work fall within the scope of protection of the application.

Some concepts related to the application are briefly explained before detailed description of various embodiments of the application. The "desktop" mentioned in the application refers to a space for presenting an icon and/or program name by an operating system. The "icon" mentioned in the application refers to a shortcut on the desktop indicating that there is an application program. A user can open a target application program associated with an icon by clicking the icon. In the conventional operating system, the overall shape of the icon is generally rounded rectangle. The "standard mode" mentioned in the application refers to a single-desktop mode, i.e., there is only one desktop in the screen of the mobile terminal. The "multiple-desktop mode" mentioned in the application refers to a case that there are multiple desktops in the screen of the mobile terminal.

Figure 1:
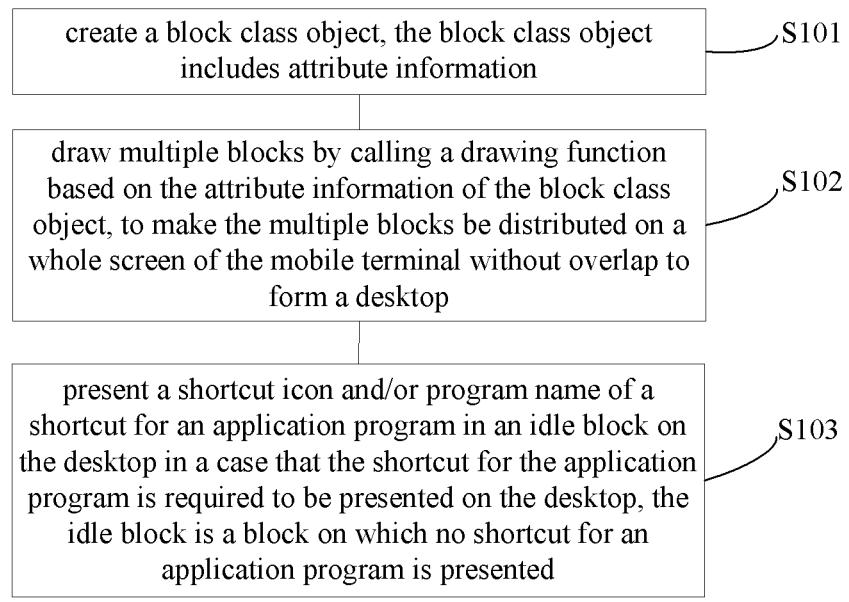
FIG. 1 is a flow chart of a desktop generation method for a mobile terminal according to an embodiment of the application.

Reference is made to FIG. 1, which illustrates a flow of a desktop generation method for a mobile terminal according to an embodiment of the application. The embodiment includes following steps S101 to S103.

In step S101, a block class object is created, where the block class object includes attribute information.

A block class object needs to be created in order to generate a block on the desktop and the block class object is created by performing information interaction with the operating system of the mobile terminal. The block class object includes multiple attributes. For example, the block class object may include a background attribute (for representing the background color of the block), a shape attribute (for representing the overall shape of the block), a size attribute (for representing a distance of the block in a certain direction, for example, the size attribute of a round block may be a radius R of the circle, and the size attribute of a rectangular block may be a width [width] or a height [height]), a position attribute (for representing coordinates of the block on the desktop [x, y, z]), and a color attribute (color [r, g, b, a] for representing the overall color of the block), and may further include attributes such as alpha, visible and scale. In creating the block class object, certain attributes may be selected based on actual requirement to describe the block class object.

In step S102, multiple blocks are drawn by calling a drawing function based on the attribute information of the block class object, to make the multiple blocks be distributed on a whole screen of the mobile terminal without overlap to form a desktop.

After the block class object is created, blocks are drawn by calling a drawing function based on attributes of the block class object. The number of blocks required to be drawn depends on factors such as the shape of the block, the size of the block and the size of the screen of the mobile terminal. During actual application, after the shape of the block, the size of each block and the size of the screen of the mobile terminal are determined, the number of blocks required to be drawn and the position for drawing each block are calculated. The shape of the block, the size of each block and the size of the screen of the mobile terminal are not limited, as long as these blocks can be distributed on the whole screen of the mobile terminal without overlap to form a desktop. Here the drawing function refers to a tool for drawing in a broad sense based on parameter information in response to an instruction. The drawing function has different names in different programming languages. For example, the drawing function is referred to as draw function in C language, and is referred to as draw method in java language. In the embodiment, the tool and the language system of the tool are not limited, as long as the corresponding blocks can be drawn based on the attribute information of the block class object.

In step S103, a shortcut icon and/or program name of a shortcut for an application program is presented in an idle block on the desktop, in a case that the shortcut for the application program is required to be presented on the desktop. The idle block is a block on which no shortcut for an application program is presented.

In general, once a desktop consisting of multiple blocks is formed on the screen of the mobile terminal, the process of desktop generation is finished. However, the desktop generation is not only for generating a desktop and the desktop is used to display icons of application programs. Hence, in practice, the desktop in the application is a desktop on which there are at least one block presenting an icon of an application program. Based on this, in the embodiment of the application, after the desktop is generated in the above step, an idle block is searched for from the multiple blocks in the desktop if a shortcut for an application program is required to be presented on the desktop, and then the icon of the application program is presented in the idle block. Here "an icon of the application program being required to be presented on the desktop" may refer to "requirement" generated in various trigger conditions. For example, an application program is required to be registered in the operating system during or after the application program is installed on the mobile terminal; the operating system generates a message after learning that certain application program is registered, and a monitor may be provided to monitor the notification message transmitted from the operating system in the embodiment of the application; and if the notification message is monitored, it is considered that the requirement for "creating a shortcut for the application program on the desktop" is generated. Under the trigger of such requirement, an icon for the application program prepared in advance, for presenting the shortcut for the application program, is read. Before, during or after the icon is read, whether there is an idle block on the desktop is detected; if there is at least one idle block, one idle block is selected from the at least one idle block to present the shortcut icon of the application program. The idle block may be selected randomly or based on a preset rule. For example, an idle block close to the left side and upper side of the screen of the mobile terminal is selected. Here the idle block is a block on which no shortcut for an application program is presented. During actual application, a list may be set in the background of the operating system of the mobile terminal for recording the sequence number and position of each block on the desktop and whether a shortcut icon is on the block, in the application. Once a shortcut icon is presented on one block by writing, this event is registered in the list, and in this way it can be conveniently known which blocks are idle by making a query on the list. It is to be noted that, for convenience of description, the above clarification is made by taking an example that only the shortcut icon of the shortcut for the application program is presented on the block, practically it may also be that only the program name or other related information of the application program is presented on the block. In actual application, both the shortcut icon and program name of the application program are presented in most cases.

According to the solution of the embodiment, the block class object including attribute information is created firstly, then multiple blocks are drawn by calling a drawing function based on the attribute information of the block class object to make the multiple blocks be distributed on the whole screen of the mobile terminal without overlap to form a desktop; in a case that a shortcut for an application program is required to be presented on the desktop, the shortcut is presented in an idle block on the desktop. Compared with the conventional technology, blocks are created and the desktop of the mobile terminal is formed by arrangement of these independent blocks in the embodiment of the application. If a shortcut for an application program is required to be presented on the desktop, the icon or program name of the shortcut is presented in one block rather than on the whole desktop (occupying certain region of the whole desktop), i.e., the icon or program name of the application program is presented using the block instead of the whole desktop. Therefore, the icon or program name of the application program can be in various shapes, and thereby increasing the tolerance of desktop to the application program and reducing the difficulty in presenting the shortcut icon on the desktop.

Figure 2A:
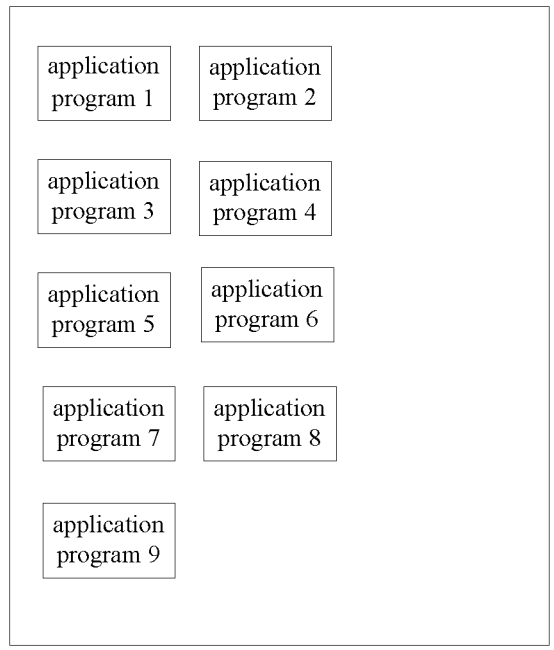
FIG. 2 (a) is a schematic diagram of a conventional desktop form.
FIG. 2(b) is a schematic diagram of a desktop form according to an embodiment of the application.
Figure 2B:
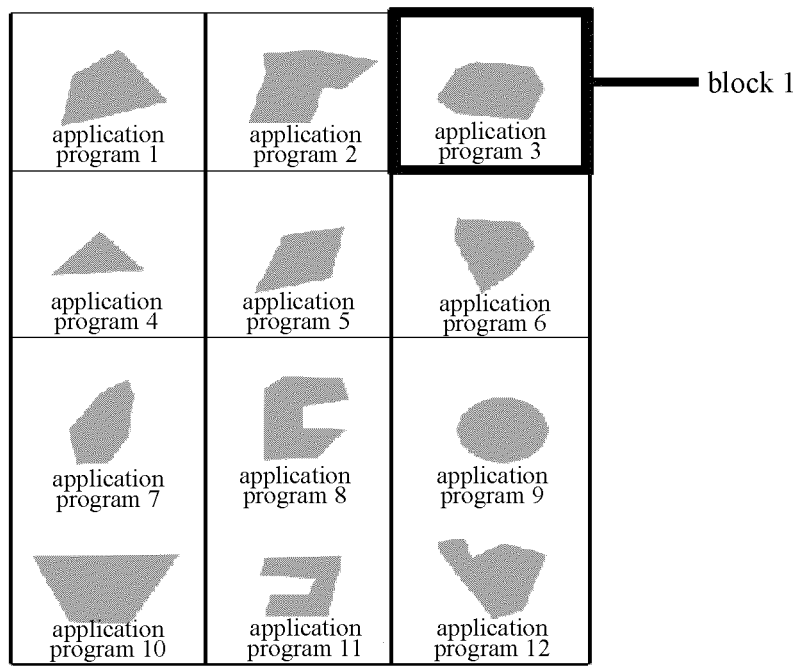

In order to illustrate the above technical effect more clearly, clarification is made in conjunction with FIG. 2 hereinafter. FIG. 2 illustrates a conventional desktop form and a desktop form of the embodiment. FIG. 2(a) illustrates a conventional desktop form. The desktop is presented as a whole panel, the shortcut icon and program name of each application program occupy one rounded rectangle region, and shortcut icons and program names of these "rounded rectangles" are arranged on the whole panel. FIG. 2(b) illustrates a desktop form of the embodiment. The desktop includes multiple blocks independent of each other, and on each block a shortcut icon and program name of an application program are presented. The shortcut icon may be in a regular shape, for example, application program 4 (triangle) and application program 9 (circle) as shown in FIG. 2(*b*), or may be in an irregular shape, for example, icons of application program 2, application program 8 and application program 11 as shown in FIG. 2(*b*). It can be seen that, blocks exist on the desktop independently, and the shortcut icons on the blocks are not limited to the shapes of the shortcut icons of the application programs, thereby the tolerance of the desktop to the application program is increased and the shortcut icon needs not to be manufactured specially by the user in advance.

Figure 3:
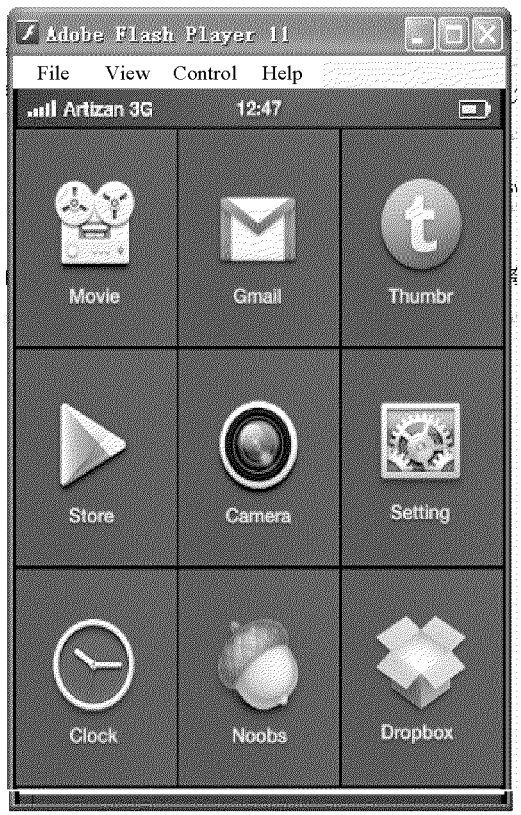
FIG. 3 is a schematic diagram of a desktop form of Panel9 according to an embodiment of embodiments of the application.

In the above embodiments of the application, the shapes of the blocks and the number of the blocks on the desktop are not limited, and the object of the application can be realized as long as blocks drawn using the drawing function can be distributed on the whole screen of the mobile terminal. However, in practice, it is preferred in the application that blocks on the desktop are rectangular blocks and the blocks are arranged in a "matrix", i.e., presenting N×M blocks (referred to as PanelNM) on the screen of the mobile terminal, where N is the number of blocks on the desktop of the mobile terminal in a transverse direction, M is the number of blocks on the mobile terminal in a longitudinal direction, and N and M each are natural numbers greater than or equal to 2. The (N×M) blocks form a desktop. For example, reference is made to FIG. 3, which illustrates a (3×3) desktop (referred to as Panel9). It can be seen from FIG. 3 that: there are 3 triangular blocks in the transverse direction and 3 triangular blocks in the longitudinal direction on the desktop, and there are 9 triangular blocks in total. Based on the similar principle and in the similar manner, a desktop of (6×6) Panel 36 or a desktop of (9×9) Panel 81 can be formed on the screen of the mobile terminal based on actual requirement. In addition, in order to view conveniently and detect a triggered region accurately, preferably an interval of certain distance is set between every two adjacent blocks in the application. The size of the interval may be set according to actual application requirement, for example, 2 mm. By increasing the interval between adjacent blocks, in one aspect, the layout of the blocks on the desktop is more explicit and more spiritual, which is convenient to view and improves user experience, and in another aspect, trigger regions (in a touch screen, a region where each block is located is a trigger region) of different blocks are distinguished apparently, and it is beneficial to detect trigger information accurately, thereby operating correctly.

After the desktop consisting of multiple blocks (a block on which a shortcut icon and a program name of an application program are presented is referred to as a non-idle block; and a blank block is referred to as an idle block) is generated on the mobile terminal as described above, a desktop user may perform various operations on the desktop. For example, the desktop user may perform a click-to-open operation on the application program. Association between the non-idle block and the shortcut icon of the application program is established. In the case that the desktop is a touch screen, the desktop user clicks a certain block with a finger and this trigger event is detected by the block, then an address of an executable file of a target application program is found out based on the association between the block and the shortcut icon and running of the executable file is started, thereby the application program is opened. For another example, the desktop user may perform selecting and moving operation on the application program. Once the desktop user selects a block by a gesture, the desktop user holds down and moves the block to drag the block to a target position. In addition, operations such as deleting a block and page turning of the desktop may also be performed. The page turning of the desktop may be performed in two ways. One way is that, only one desktop consisting of blocks is generated, and the second desktop is then generated according to the preceding steps in response to a trigger. For example, in the case that the user touches the touch screen and slides the desktop left and right by using a finger, a new desktop including multiple blocks is generated in the new region line out according to the steps in the above embodiments, thereby page turning is achieved. The other way is that, multiple desktops are generated once, only one desktop is displayed on the screen of the mobile terminal, and the block containing the shortcut icon and the program name which is not presented in the current desktop is presented in response to a trigger. For example, in the case that the number of shortcut icons and program names of application programs required to be presented on the desktop is greater than the number of blocks of one screen, the relationship between the blocks and the shortcut icons and program names of application programs out of the one screen is recorded, and the blocks which are not presented on the current screen are presented in sequence (or according to other rules) when the user slides on the desktop, thereby page turning is achieved.

Figure 4:
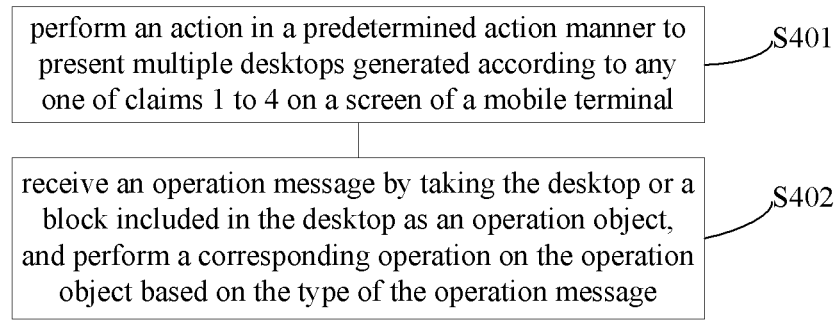
FIG. 4 is a flow chart of a desktop operation method for a mobile terminal according to an embodiment of the application.

The contents described above are technical solutions of the application for a standard desktop mode (i.e., there is only one desktop on the screen of the mobile terminal), and hereinafter the technical solutions of the application will be further illustrated for a multiple-desktop mode (i.e., there are multiple desktops on the screen of the mobile terminal). Reference is made to FIG. 4, which illustrates a desktop operation method for a mobile terminal according to an embodiment. The embodiment includes following steps S401 to S402.

In step S401, an action is performed in a predetermined action manner to present multiple desktops according to any one of claims 1 to 3 on a screen of the mobile terminal.

A desktop user may change the presentation way of the desktop on the mobile terminal in a predetermined action manner, to achieve conversion between different desktop modes. For example, in the case that the current desktop is in a standard desktop mode, the desktop user performs a grip action on the desktop consisting of multiple blocks in the standard desktop mode and then multiple desktops are presented on the screen of the mobile terminal; these desktops may be desktops generated newly under the trigger of the "grip" action or may be multiple desktops generated when the desktop in the standard desktop mode is generated and presented simultaneously under the trigger of the "grip" action. Similarly, in the case that the current desktop is in the multiple-desktop mode, the desktop user spaces out two desktops in the multiple-desktop mode with figures, and the desktop is returned to the desktop state in the standard desktop mode. In addition to be triggered by a special gesture set in advance, the conversion between the two modes may also be triggered by a conversion button. Once the button is triggered, the current desktop mode is conversed to other desktop mode different from the current desktop mode. The embodiment refers to an operation method in the multiple-desktop mode.

In step S402, an operation message is received by taking the desktop or the block included in the desktop as an operation object, and a corresponding operation is performed on the operation object based on the type of the operation message.

In the case that multiple desktops are presented on the desktop of the mobile terminal, an operation message may be received, a desktop or one or more blocks included in a desktop in the multiple-desktop mode is taken as an operation object, and a corresponding operation is performed on the operation object based on the type of the operation message. Different types of operation messages may correspond to different operation objects, and accordingly may correspond to different operations. In order to describe the operation on the desktop of the mobile terminal in the embodiment more clearly, three operation ways, i.e., integral movement of the desktop, multi-selecting and moving of blocks in the desktop, and displaying and hiding of the desktop, are described hereinafter.

The first operation way is integral movement of the desktop. In this operation way, the desktop including multiple blocks is as the operation object, and the type of the operation message is integral movement of the desktop. In the multiple-desktop mode, multiple Panel (NM), for example, 4 or 9 Panel9, are displayed on the screen of the mobile terminal. Here for convenience of description, a predetermined gesture for indicating integral movement of the desktop is set as "holding down and dragging" the desktop. In the application, an independent detector may be provided for each desktop, or one detector is shared by all the desktops, for detecting whether an operation message of integral movement is received by one of the multiple desktops. For example, the detector detects that there is a trigger message of "holding down" for a certain desktop (referred to as desktop A), then it is considered that the message of integral movement of the desktop A is received; in this case, a list corresponding to the desktop A is created for recording sequence numbers of blocks included in the desktop A and position information of the blocks in the desktop A in the application. Further, a target position to which the desktop A is to be moved integrally is detected. For example, the detector detects that the "holding down" stays at a certain desktop position, then it is considered that the stayed position is the target position; in this case, the desktop is drawn at the target position by calling a drawing function, based on the sequence numbers of the blocks and the position information of blocks in the desktop recorded in the list. During actual application, the target position to which the desktop A is moved may be a position where another desktop (referred to as desktop B) is located. In this case, in order to avoid the desktop B being covered, sequence numbers of blocks in the desktop B and position information of the blocks in the desktop B may be recorded in a list, and the desktop B is drawn at the position where the desktop A is located by calling the drawing function, based on the sequence numbers of the blocks in the desktop B and the position information of the blocks in the desktop B recorded in the list. In the conventional multiple-desktop mode, the shortcut icon of each application program is presented on a whole desktop, which can not be moved integrally, therefore, there is no practical meaning for the multiple-desktop mode. However, in the operation way of the embodiment, in a case that the desktop includes 9 blocks originally, the 9 blocks function as one big block to move, i.e., are moved integrally.

The second operation way is multi-selecting and moving of blocks in the desktop. In this operation way, the block in the desktop is as the operation object, and the type of the operation message is selecting blocks in one or more desktops and moving the selected blocks to a target desktop. Here for convenience of description, a predetermined gesture for indicating multi-selecting and moving of blocks in the desktop is set as "clicking, holding down and dragging" the blocks in the desktop. In the multiple-desktop mode, each desktop includes multiple blocks. The detector may detect whether an operation message of selecting and moving is received by the block in the screen of the mobile terminal. For example, the detector detects that several blocks are clicked, then it is considered that these blocks receive the operation message of selecting and moving; in this case, sequence numbers of the clicked blocks and position information of the clicked blocks in the desktop are recorded in a list. The list is created when the first of the clicked blocks is clicked. In order to obtain a good visual experience of the desktop user, once the desktop user holds down one of the clicked blocks after the clicking operation ends, other clicked blocks may be set to be converged around the "held down" block. These clicked blocks may be from the same desktop or different desktops in the multiple-desktop mode. After the desktop user "holds down and drags" the block to a certain target position, positions of idle blocks and the blocks in the list are interchanged based on sequence numbers of the blocks and position information of the blocks in the desktop recorded in the list, thereby multi-selecting and moving of the blocks is achieved.

It is to be noted that, in some cases, the number of idle blocks in the desktop where the target position is located may be less than the number of blocks selected to be moved by the desktop user, i.e., the desktop where the target position is located has "insufficient space", in this case positions of the selected blocks and positions of the idle blocks in the desktop where the target position is located are interchanged in sequence according to a priority selection, and other extra selected blocks are returned to the original positions. In actual application, in order to avoid the case that the blocks selected by the desktop user can not move to the target position smoothly, it is preferably in the application that once the target position to which the blocks are to be moved is detected, it is detected whether there is an idle block in the desktop where the target position is located; and if there is an idle block and the number of the idle blocks is greater than or equal to the number of the blocks recorded in the list, i.e., the desktop where the target position is located has "sufficient space", positions of the idle blocks and positions of the blocks in the list are interchanged based on sequence numbers of the blocks and position information of the blocks on the desktop recorded in the list. In order to improve user experience, a green block (or corresponding text) may be displayed around the desktop where the target position is located in the case of "sufficient space" of the desktop where the target position is located, and a red block (or corresponding text) is displayed in the case of "insufficient space" of the desktop where the target position is located.

The third operation way is displaying and hiding of the desktop. In this operation way, the block in the desktop is as the operation object, and the type of the operation message is displaying and hiding of the desktop. As described above, the block in the desktop has a visible attribute, and in the multiple-desktop mode each desktop as a whole may also have a visible attribute. Here for convenience of description, a predetermined gesture indicating displaying and hiding of the desktop is set as "double-clicking" the block in the desktop. Hereinafter it is illustrated by taking the desktop Panel9 as an example. The desktop Panel9 and blocks in the desktop Panel9 each have a visible attribute, and the displaying and hiding states of the Panel9 and its blocks may be changed by changing the visible attribute. Assuming that the Panel9 is visible initially, i.e., the value of visible is true, shortcut icons and program names of application programs presented on blocks in the Panel9 are displayed. Once the desktop user double-clicks, the attribute value of the visible attribute of the block changes to be the opposite attribute value, i.e., changing from true to false. The desktop is then refreshed, and in this case the block in the desktop drawn by calling the drawing function is not drawn, thereby hiding the desktop and the blocks in the desktop. Similarly, if the Panel9 is invisible initially, blocks in the desktop are drawn by calling the drawing function based on the attribute value after the desktop is refreshed, thereby displaying the desktop and the blocks in the desktop.

Figure 5:
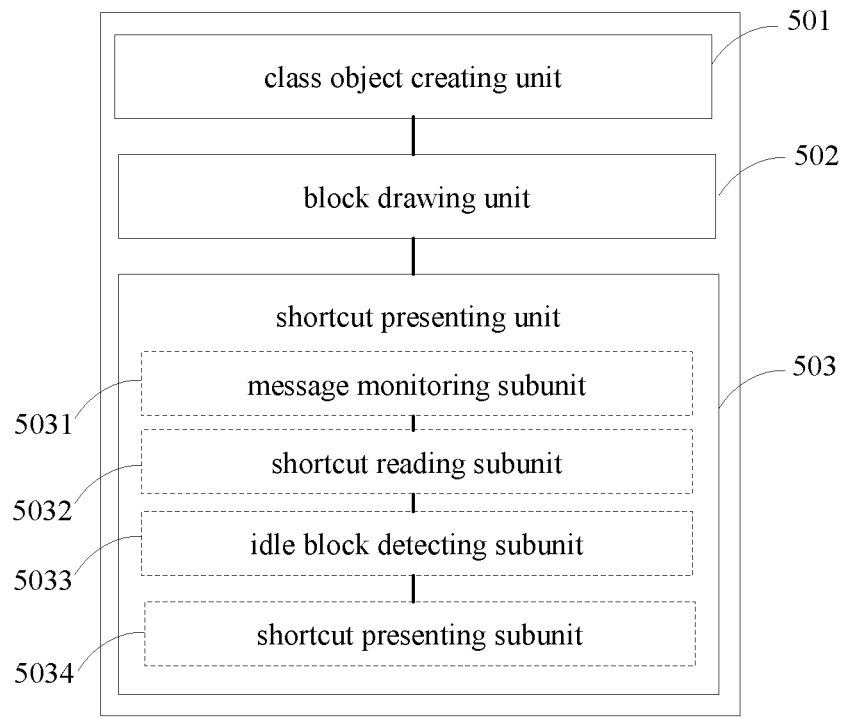
FIG. 5 is a structural block diagram of a desktop generation apparatus for a mobile terminal according to an embodiment of the application.

The embodiments of the desktop generation method and the desktop operation method for the mobile terminal of the application are described in detail above, accordingly, a desktop generation apparatus for a mobile terminal and a desktop operation apparatus for a mobile terminal are further provided according to embodiments of the application. Reference is made to FIG. 5, which illustrates a structural block diagram of the desktop generation apparatus for the mobile terminal according to an embodiment of the application. The apparatus includes a class object creating unit 501, a block drawing unit 502 and a shortcut presenting unit 503.

The class object creating unit 501 is configured to create a block class object, where the block class object includes attribute information.

The block drawing unit 502 is configured to draw multiple blocks by calling a drawing function based on the attribute information of the block class object, where the multiple blocks are distributed on a whole screen of the mobile terminal without overlap to form a desktop.

The shortcut presenting unit 503 is configured to present, in an idle block on the desktop, a shortcut icon and/or program name of a shortcut for an application program, in a case that the shortcut for the application program is required to be presented on the desktop, where the idle block is a block on which no shortcut for an application program is presented.

A working process of the apparatus is as follows. The class object creating unit 501 creates a block class object including attribute information. The block drawing unit 502 then draws multiple blocks by calling a drawing function based on the attribute information of the block class object, to make the multiple blocks be distributed on a whole screen of the mobile terminal without overlap to form a desktop. The shortcut presenting unit 503 then presents a shortcut icon and/or program name of a shortcut for an application program in an idle block on the desktop in a case that the shortcut for the application program is required to be presented on the desktop, where the idle block is a block on which no shortcut for an application program is presented.

In the apparatus embodiment, the block class object including attribute information is created firstly, then multiple blocks are drawn by calling a drawing function based on the attribute information of the block class object, to make the multiple blocks be distributed on the whole screen of the mobile terminal without overlap to form a desktop; in a case that a shortcut for an application program is required to be presented on the desktop, the shortcut is presented in an idle block on the desktop. Compared with the conventional technology, blocks are created and the desktop of the mobile terminal is formed by arrangement of these independent blocks in the apparatus embodiment. If a shortcut for an application program is required to be presented on the desktop, the icon or program name of the shortcut is presented in one block rather than on the whole desktop (occupying certain region of the whole desktop), i.e., the icon or program name of the application program is presented using the block instead of the whole desktop. Therefore, the icon or program name of the application program can be in various shapes, and thereby increasing the tolerance of the desktop to the application program and reducing the difficulty in presenting the shortcut icon on the desktop.

In the above embodiment of the desktop generation apparatus, the shortcut for the application program may be presented in different ways, and accordingly the shortcut presenting unit 503 has different internal structures. In the application, preferably the shortcut presenting unit 503 includes a message monitoring subunit 5031, a shortcut reading subunit 5032, an idle block detecting subunit 5033 and a shortcut presenting subunit 5034. The message monitoring subunit 5031 is configured to monitor a message of requiring creating a shortcut for an application program on the desktop, which is sent from an operating system of the mobile terminal. The shortcut reading subunit 5032 is configured to read a shortcut icon and/or program name of the application program for which the shortcut is required to be created on the desktop. The idle block detecting subunit 5033 is configured to detect an idle block on the desktop. The shortcut presenting subunit 5034 is configured to present the shortcut icon and/or program name in an idle block, in the case that it is detected that there is an idle block on the desktop. Similar to the method embodiment, in the desktop generation embodiment, the generated block may be in various shapes, and the blocks may be arranged on the screen of the mobile terminal in multiple ways, as long as the blocks can be distributed on the whole screen of the mobile terminal to form a desktop. In the case that the block is a rectangular block, multiple (N×M) blocks may be arranged in a matrix, where N is the number of the blocks on the desktop of the mobile terminal in a transverse direction, M is the number of the blocks of the mobile terminal in a longitudinal direction, and N and M each are natural numbers greater than or equal to 2. An interval of a preset distance may be set between adjacent blocks arranged in the matrix to facilitate trigger reception and improve user experience.

Figure 6:
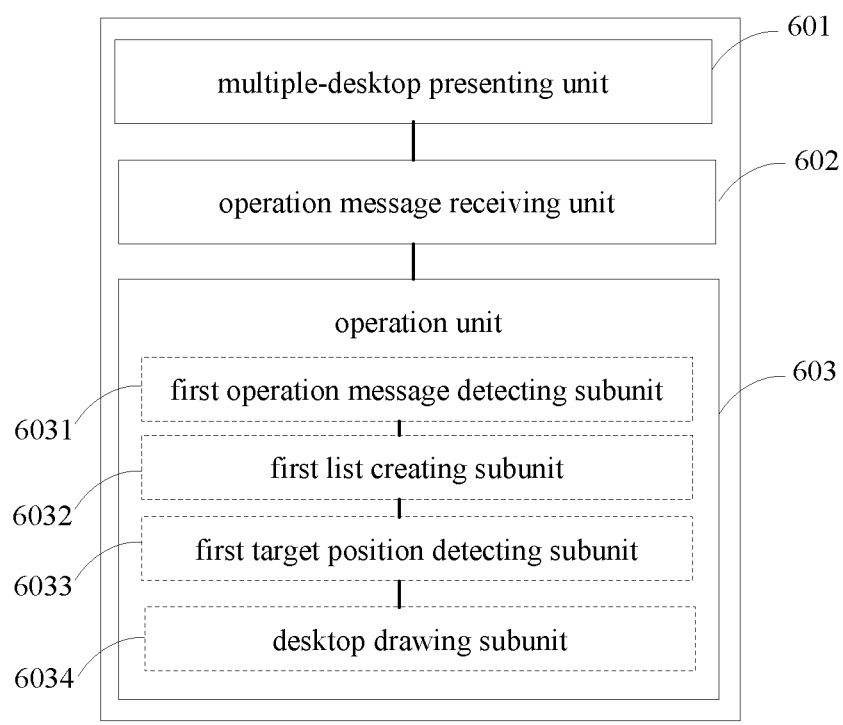
FIG. 6 is a structural block diagram of a desktop operation apparatus for a mobile terminal according to an embodiment of the application.

Reference is made to FIG. 6 which illustrates a desktop operation apparatus for a mobile terminal according to an embodiment. The apparatus embodiment includes a multiple-desktop presenting unit 601, an operation message receiving unit 602 and an operation unit 603.

The multiple-desktop presenting unit 601 is configured to perform an action in a predetermined action manner to present multiple desktops described above on a screen of the mobile terminal.

The operation message receiving unit 602 is configured to receive an operation message taking the desktop or a block included in the desktop as an operation object.

The operation unit 603 is configured to perform a corresponding operation on the operation object based on a type of the operation message.

A working process of the apparatus embodiment is as follows. The multiple-desktop presenting unit 601 performs an action in a predetermined action manner to present multiple desktops described above on the screen of the mobile terminal; the operation message receiving unit 602 receives an operation message taking the desktop or a block included in the desktop as an operation object; and the operation unit 603 then performs a corresponding operation on the operation object based on the type of the operation message.

In the above apparatus embodiment, the internal structure of the operation unit is different in view of different operation object and different operation way. For example, in the case that the operation object is the desktop and the type of the operation message is integral movement of the desktop, the operation unit 603 may include a first operation message detecting subunit 6031, a first list creating subunit 6032, a first target position detecting subunit 6033 and a desktop drawing subunit 6034.

The first operation message detecting subunit 6031 is configured to detect whether the operation message of integral movement is received by one of the multiple desktops, and trigger the list creating subunit in the case that the operation message of integral movement is received by one desktop. The first list creating subunit 6032 is configured to create a list corresponding to the one desktop for recording sequence numbers of blocks included in the one desktop and position information of the blocks in the one desktop. The first target position detecting subunit 6033 is configured to detect a target position to which the one desktop is to be moved integrally. The desktop drawing subunit 6034 is configured to draw the desktop at the target position by calling a drawing function, based on the sequence numbers of the blocks and the position information of the blocks in the desktop recorded in the list.

For another example, in the case that the operation object is the block in the desktop and the type of the operation message is selecting a block in one or more desktops and moving the selected block to a target desktop, the operation unit may include a second operation message detecting subunit, a second list creating subunit, a block information recording subunit, a second target position detecting subunit and a position interchanging subunit. Specifically, the second operation message detecting subunit is configured to detect whether the operation message of selecting and moving is received by a block in the screen of the mobile terminal, and trigger the block information recording subunit in the case that the operation message of selecting and moving is received by a block. The block information recording subunit is configured to record in a list a sequence number of the block and position information of the block in the desktop. The second list creating subunit is configured to create the list when the operation message of selecting and moving is received by a block in the screen of the mobile terminal for the first time. The second target position detecting subunit is configured to detect a target position to which the block is to be moved. The position interchanging subunit is configured to interchange positions of an idle block and the block in the list based on the sequence number of the block and the position information of the block in the desktop recorded in the list.

The operation unit further includes an idle block detecting subunit. The idle block detecting subunit is configured to detect whether there is an idle block in a desktop where the target position is located, in the case that the target position to which the block is to be moved is detected; and trigger the position interchanging subunit in the case that there is an idle block and the number of the idle blocks is greater than or equal to the number of the blocks recorded in the list.

For another example, in the case that the operation object is the block in the desktop and the type of the operation message is displaying and hiding of the desktop, the operation unit includes a third operation message detecting subunit, a block attribute adjusting subunit and a displaying and hiding subunit. Specifically, the third operation message detecting subunit is configured to detect whether the operation message of displaying and hiding is received by one of the multiple desktops; and trigger the block attribute adjusting subunit in the case that the operation message of displaying and hiding is received by one desktop. The block attribute adjusting subunit is configured to change an attribute value of a visible attribute of a block in the one desktop to an opposite attribute value. The displaying and hiding subunit is configured to draw the block in the desktop by calling a drawing function to display the desktop and the block in the desktop or not draw the block in the desktop by calling the drawing function to hide the desktop and the block in the desktop based on the attribute value, after the desktop is refreshed.

It is to be noted that, for convenience of description, the above embodiments and variants thereof in the specification lay emphasis on the difference from other embodiments and variants thereof, and one may refer to the description of other embodiments for the same or similar parts between various embodiments. Particularly, the description of the apparatus embodiments and the improved implementations thereof is simple since they are substantially similar to the method embodiments, and for the related parts one may refer to the description of the method embodiments. The various units of the apparatus embodiments described above may be or may not be physically separated, i.e., the units may be located on the same place or distributed in multiple network environments. During actual application, some or all of the units may be selected to realize the object of the technical solution of the embodiment based on actual requirement, and the disclosure can be understood and implemented by those skilled in the art without any creative work, The specific embodiments of the application are described above. It should be noted that, several improvements and modifications may be made to the embodiments by those skilled in the art without departing from the principles of the application, and these improvements and modifications should be regarded to fall within the scope of protection of the application.

What is claimed is:

1. A desktop generation method for a mobile terminal, comprising:
    creating a block class object, wherein the block class object comprises attribute information;
    drawing, by calling a drawing function, a plurality of blocks based on the attribute information of the block class object, wherein the plurality of blocks are distributed on a screen of the mobile terminal without overlap to form a desktop; wherein each block of the plurality of blocks is not transparent and is visible for a user, the plurality of blocks including at least one block that is an idle block, wherein an idle block is a block on which no shortcut for an application program is currently presented;
    presenting, in a first block that has been an idle block on the desktop, a shortcut icon and/or program name of a shortcut for an application program in a case that the shortcut for the application program is required to be presented on the desktop; wherein one application program is associated with the first block, and the shortcut icon and/or program name of the shortcut for the application program only occupy a partial region of the first block, and wherein the shortcut icon is in an irregular shape;
    detecting a triggered block of the plurality of blocks, the triggered block being triggered by the user, wherein the triggered block is triggered even if the user clicks a region of the screen outside the icon but within the triggered block;

performing an operation on an application program associated with the triggered block;

receiving an operation message of selecting and moving two or more blocks of the plurality of blocks when the two or more blocks are clicked;

selecting one of the clicked two or more blocks and converging the rest of the clicked two or more blocks around the one of the clicked two or more blocks; and moving the two or more clicked blocks simultaneously to a target position of the desktop.

2. The method according to claim 1, wherein presenting, in an idle block on the desktop, a shortcut icon and/or program name of a shortcut for an application program in a case that the shortcut for the application program is required to be presented on the desktop comprises:

monitoring a message of requiring creating a shortcut for an application program on the desktop which is sent from an operating system of the mobile terminal; reading a shortcut icon and/or program name of the application program for which the shortcut is required to be created on the desktop; detecting an idle block on the desktop and presenting the shortcut icon and/or program name of the application program in an idle block.

3. The method according to claim 1, wherein the block is a rectangular block, the number of the plurality of blocks is N×M, wherein N is the number of the blocks on the desktop of the mobile terminal in a transverse direction, M is the number of the blocks on the desktop of the mobile terminal in a longitudinal direction, and N and M each are natural numbers greater than or equal to 2.

4. The method according to claim 1, wherein the blocks are spaced apart by a preset distance.

5. A desktop operation method for a mobile terminal, comprising:

performing an action in a predetermined action manner to present a plurality of desktops on a screen of the mobile terminal, wherein each of the plurality of desktops is generated by:

creating a block class object, wherein the block class object comprises attribute information; and drawing, by calling a drawing function, a plurality of blocks based on the attribute information of the block class object, wherein the plurality of blocks are distributed on a screen of the mobile terminal without overlap to form a desktop; wherein each block of the plurality of blocks is not transparent and is visible for a user, the plurality of blocks including at least one block that is an idle block, wherein an idle block is a block on which no shortcut for an application program is currently presented; wherein one application program is associated with one block that was previously an idle block but on which a shortcut for an application program is currently presented, and a shortcut icon and/or program name of a shortcut for an application program only occupy a partial region of the one block, and wherein the shortcut icon is in an irregular shape;

receiving an operation message by taking the desktop or a block comprised in the desktop as an operation object, and performing a corresponding operation on the operation object based on a type of the operation message;

detecting a triggered block of the plurality of blocks, the triggered block being triggered by the user, wherein the triggered block is triggered even if the user clicks a region of the screen outside the icon but within the triggered block;

performing an operation on an application program associated with the triggered block;

receiving an operation message of selecting and moving two or more blocks when the two or more blocks are clicked, the two or more blocks being located in the same desktop or being located in different desktops of the plurality of desktops;

selecting one of the clicked two or more blocks and converging the rest of the clicked two or more blocks around the one of the clicked two or more blocks; and moving the clicked two or more blocks simultaneously to a target desktop of the plurality of desktops.

6. The method according to claim 1, wherein the desktop is a plurality of desktops and the method further comprises:

receiving an operation message by taking the desktop or a block comprised in the desktop as an operation object, wherein the operation message is detected by a detector that is shared by the plurality of desktops;

performing an action in a predetermined action manner to present a plurality of desktops on a screen of the mobile terminal; wherein the operation object is the desktop, the type of the operation message is integral movement of the desktop, and performing the corresponding operation on the operation object based on the type of the operation message comprises:

detecting whether the operation message of integral movement is received by one of the plurality of desktops; and creating a list corresponding to the one desktop for recording sequence numbers of blocks comprised in the one desktop and position information of the blocks in the one desktop, in a case that the operation message of integral movement is received by the one desktop; wherein the integral movement is for moving all of the plurality of blocks comprised in the one desktop into another desktop; and detecting a target position to which the one desktop is to be moved integrally, and drawing the desktop at the target position by calling a drawing function, based on the sequence numbers of the blocks and the position information of the blocks in the desktop recorded in the list.

7. The method according to claim 5, wherein the operation object is the block in the desktop, the type of the operation message is selecting a block in one or more desktops and moving the selected block to a target desktop, and performing the corresponding operation on the operation object based on the type of the operation message comprises:

detecting whether the operation message of selecting and moving is received by a block in the screen of the mobile terminal; and recording in a list a sequence number of the block and position information of the block in the desktop where the block is located, in a case that the operation message of selecting and moving is received by the block, wherein the list is created when the operation message of selecting and moving is received by a block in the screen of the mobile terminal for the first time; and detecting a target position to which the block is to be moved, and interchanging positions of an idle block on a desktop where the target position is located and the block in the list, based on the sequence number of the block and the position information of the block in the desktop where the block is located recorded in the list.

8. The method according to claim 7, wherein it is detected whether there is an idle block in the desktop where the target position is located in a case that the target position to which the block is to be moved is detected; and in a case that there is an idle block and the number of the idle blocks is greater than or equal to the number of the blocks recorded in the list, positions of the idle block and the block in the list are interchanged based on the sequence number of the block and the position information of the block in the desktop recorded in the list.

9. The method according to claim 7, wherein it is detected whether there is an idle block in the desktop where the target position is located in a case that the target position to which the block is to be moved is detected; and in a case that there is an idle block and the number of the idle blocks is less than the number of the blocks recorded in the list, positions of the idle block and the block in the list are interchanged in sequence listed by the sequence number, and other extra blocks in the list are returned to original positions.

10. The method according to claim 5, wherein the operation object is the block in the desktop, the type of the operation message is displaying and hiding of the desktop, and performing the corresponding operation on the operation object based on the type of the operation message comprises:

detecting whether the operation message of displaying and hiding is received by one of the plurality of desktops; changing an attribute value of a visible attribute of a block in the one desktop to an opposite attribute value, in a case that the operation message of displaying and hiding is received by the one desktop; refreshing the desktop, and drawing the block in the desktop by calling a drawing function to display the desktop and the block in the desktop or not drawing the block in the desktop by calling the drawing function to hide the desktop and the block in the desktop based on the attribute value.

11. The method according to claim 5, wherein the block is a rectangular block, the number of the plurality of blocks is N×M, wherein N is the number of the blocks on the desktop of the mobile terminal in a transverse direction, M is the number of the blocks on the desktop of the mobile terminal in a longitudinal direction, and N and M each are natural numbers greater than or equal to 2.

12. The method according to claim 5, wherein the blocks are spaced apart by a preset distance.

13. A desktop generation apparatus for a mobile terminal, comprising a processor and a non-transitory storage medium having a plurality of instructions stored thereon that, when executed by the processor, cause the processor to:

create a block class object, wherein the block class object comprises attribute information;

draw a plurality of blocks by calling a drawing function based on the attribute information of the block class object, wherein the plurality of blocks are distributed on a screen of the mobile terminal without overlap to form a desktop; wherein each block of the plurality of blocks is not transparent and is visible for a user, the plurality of blocks including at least one block that is an idle block, wherein an idle block is a block on which no shortcut for an application program is currently presented;

present, in a first block that has been an idle block on the desktop, the shortcut icon and/or program name of a shortcut for an application program in a case that the shortcut for the application program is required to be presented on the desktop; wherein one application program is associated with the first block, and the shortcut icon and/or program name of the shortcut for the application program only occupy a partial region of the first block, and wherein the shortcut icon is in an irregular shape;

detect a triggered block of the plurality of blocks, the triggered block being triggered by the user, wherein the triggered block is triggered even if the user clicks a region of the screen outside the icon but within the triggered block;

perform an operation on an application program associated with the triggered block;

receive an operation message of selecting and moving two or more blocks of the plurality of blocks when the two or more block are clicked;

select one of the clicked two or more blocks and converge the rest of the clicked two or more blocks around the one of the clicked two or more blocks; and move the clicked two or more blocks simultaneously to a target position of the desktop.

14. The apparatus according to claim 13, wherein the instructions further cause the processor to:

monitor a message of requiring creating a shortcut for an application program on the desktop which is sent from an operating system of the mobile terminal;

read a shortcut icon and/or program name of the application program for which the shortcut is required to be created on the desktop;

detect an idle block on the desktop; and present the shortcut icon and/or program name of the application program in an idle block, in a case that it is detected that there is an idle block on the desktop.

15. The apparatus according to claim 13, wherein the blocks are spaced apart by a preset distance.

* * * * *